(12) United States Patent
Bedell et al.

(10) Patent No.: US 7,397,634 B2
(45) Date of Patent: Jul. 8, 2008

(54) MAGNETIC HEAD COIL SYSTEM AND DAMASCENE/REACTIVE ION ETCHING METHOD FOR MANUFACTURING THE SAME

(75) Inventors: Daniel Wayne Bedell, San Jose, CA (US); Richard Hsiao, San Jose, CA (US); James D. Jarratt, Schenectady, NY (US); Patrick Rush Webb, Los Gatos, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 287 days.

(21) Appl. No.: 10/602,462

(22) Filed: Jun. 23, 2003

(65) Prior Publication Data
US 2004/0257701 A1    Dec. 23, 2004

(51) Int. Cl.
G11B 5/17 (2006.01)
(52) U.S. Cl. ...................................... 360/126; 360/317
(58) Field of Classification Search ................. 360/317, 360/123, 318, 126; 29/603.13, 603.14
See application file for complete search history.

(56) References Cited

U.S. PATENT DOCUMENTS

| | | | | |
|---|---|---|---|---|
| 5,884,990 | A | 3/1999 | Burghartz et al. | 336/200 |
| 6,472,962 | B1 | 10/2002 | Guo et al. | 333/262 |
| 6,477,765 | B1 * | 11/2002 | Herrera | 29/603.14 |
| 6,570,739 | B2 * | 5/2003 | Hsiao et al. | 360/123 |
| 6,757,133 | B1 * | 6/2004 | Sato | 360/126 |
| 6,801,407 | B2 * | 10/2004 | Sasaki et al. | 360/317 |
| 6,859,997 | B1 * | 3/2005 | Tong et al. | 29/603.13 |
| 2001/0013991 | A1 * | 8/2001 | Rose et al. | 360/126 |
| 2002/0066175 | A1 | 6/2002 | Huang et al. | 29/602.1 |
| 2002/0069512 | A1 | 6/2002 | Adams et al. | 29/606 |
| 2002/0171517 | A1 | 11/2002 | Guo et al. | 333/262 |
| 2002/0181162 | A1 | 12/2002 | Chen et al. | 360/317 |
| 2002/0191349 | A1 * | 12/2002 | Hsu et al. | 360/317 |
| 2002/0191350 | A1 * | 12/2002 | Emilio Santini | 360/317 |
| 2003/0218835 | A1 * | 11/2003 | Hsiao et al. | 360/317 |
| 2004/0165317 | A1 * | 8/2004 | Westwood | 360/317 |

FOREIGN PATENT DOCUMENTS

| | | | | |
|---|---|---|---|---|
| JP | 03283104 | A | * | 12/1991 |
| JP | 11120509 | A | * | 4/1999 |

* cited by examiner

Primary Examiner—Tianjie Chen
(74) Attorney, Agent, or Firm—Zilka-Kotab, PC

(57) ABSTRACT

A system and method are provided for manufacturing a coil structure for a magnetic head. Initially, an insulating layer is deposited with a photoresist layer deposited on the insulating layer. Moreover, a silicon dielectric layer is deposited on the photoresist layer as a hard mask. The silicon dielectric layer is then masked. A plurality of channels is subsequently formed in the silicon dielectric layer using reactive ion etching (i.e. $CF_4/CHF_3$). The silicon dielectric layer is then used as a hard mask to transfer the channel pattern in the photoresist layer using reactive ion etching with, for example, $H_2/N_2/CH_3F/C_2H_4$ reducing chemistry. To obtain an optimal channel profile with the desired high aspect ratio, channel formation includes a first segment defining a first angle and a second segment defining a second angle. Thereafter, a conductive seed layer is deposited in the channels and the channels are filled with a conductive material to define a coil structure. Chemical-mechanical polishing may then be used to planarize the conductive material.

26 Claims, 7 Drawing Sheets

US 7,397,634 B2

MAGNETIC HEAD COIL SYSTEM AND DAMASCENE/REACTIVE ION ETCHING METHOD FOR MANUFACTURING THE SAME

FIELD OF THE INVENTION

The present invention relates to magnetic head coil structures, and more particularly, this invention relates to improving the fabrication of high aspect ratio and narrow coil pitch magnetic head coil structures.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads are then used to read data from the tracks on the disk surfaces.

FIGS. 1-2 illustrate a method of manufacturing a coil structure associated with a magnetic head, in accordance with the prior art. FIG. 1 illustrates a cross-sectional view of an initial stack 100 with which a prior art coil structure may be manufactured. As shown, the stack 100 includes a first layer 102 including $Al_2O_3$ or some other material. Deposited on the first layer 102 is a second layer 104 including Cr or the like. A third layer 106 is deposited on the second layer 104. The third layer 106 is constructed from a conductive material such as Cu or the like.

On the third layer 106 is a fourth layer 108, typically masked photoresist, that is exposed and developed to define a plurality of channels 110. Such channels 110, in turn, define a coil structure. A conductive material 111, such as Cu, is then typically electroplated into the channels. The fourth layer 108 is then wet stripped and the layers 104, 106 ion milled away. An insulation material, like photoresist is introduced between the channels to form a coil structure with a plurality of electrically isolated turns. FIG. 2 illustrates another cross-sectional view of the stack 100 of FIG. 1 after the coil structure has been completed.

A coil structure is thus provided with a certain pitch (Z) and aspect ratio (Y/X). A high aspect ratio is desirable, for a given coil width (X), as the coil resistance decreases with increasing aspect ratio. This reduced coil resistance will lead to reduced device heating during operation (i.e. writing induced protrusion). Traditionally, however, such aspect ratio is limited due to inherent deficiencies with the ion milling process. For example, ion milling may exhibit difficulties in removing the third layer 106 and the second layer 104 if the ratio (Z/X) is too small. Incomplete removal of any conducting layers during ion milling results in electrically shorted coil turns.

There is thus a need for a magnetic head coil structure and a method of manufacturing the same with high aspect ratios without the problems associated with the prior art.

DISCLOSURE OF THE INVENTION

A system and method are provided for manufacturing a coil structure for a magnetic head. Initially, an insulating layer is deposited with a photoresist layer deposited on the insulating layer. Moreover, a silicon dielectric layer is deposited on the photoresist layer as a hard mask. The silicon dielectric layer is then masked. A plurality of channels is subsequently formed in the silicon dielectric layer using reactive ion etching (i.e. $CF_4/CHF_3$). The silicon dielectric layer is then used as a hard mask to transfer the channel pattern in the photoresist layer using reactive ion etching with, for example, $H_2/N_2/CH_3F/C_2H_4$ reducing chemistry. To obtain an optimal channel profile with the desired high aspect ratio, channel formation includes a first segment defining a first angle and a second segment defining a second angle. Thereafter, a conductive seed layer is deposited in the channels and the channels are filled with a conductive material to define a coil structure. Chemical-mechanical polishing may then be used to planarize the conductive material.

In one embodiment, the first segment of each channel may be positioned below the second segment of each channel. Moreover, the first segment may define a beveled angle. Optionally, the first segment may define an angle between 70 and 85 degrees.

In contrast, the second segment may define an angle that is substantially vertical. As an option, the second segment may define an angle between 80 and 90 degrees.

In another embodiment, the reactive ion etching may include $H_2/N_2/CH_3F/C_2H_4$ reducing chemistry with $H_2/N_2/CH_3F/C_2H_4$ gas ratios of 50-100/100-200/1-3/1-10, at a pressure range of 5 to 20 mTorr and a temperature range of −30 to 0° C. In an inductively coupled plasma system, the coil power can be 900 to 1500 watts, the radio frequency (RF) power can be 100 to 200 watts, and the magnitude of RF bias can be about 120V. Still yet, the photoresist may be hard-baked. Optionally, an aspect ratio of the channels may be at least 2.5.

In still another embodiment, the conductive seed layer and conductive material may include at least one of Cu, Ta, and TaN. As a further option, the silicon dielectric layer may include at least one of $SiO_2$ and $Si_3N_4$. The masking may optionally include depositing another imaging photoresist layer. Optionally, the silicon dielectric layer may be removed by chemical-mechanical polishing (CMP). Still yet, an adhesion promoter layer may be deposited between the silicon dielectric layer and the imaging photoresist layer.

BRIEF DESCRIPTION OF THE DRAWINGS

For a fuller understanding of the nature and advantages of the present invention, as well as the preferred mode of use, reference should be made to the following detailed description read in conjunction with the accompanying drawings which are not necessarily drawn to scale.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
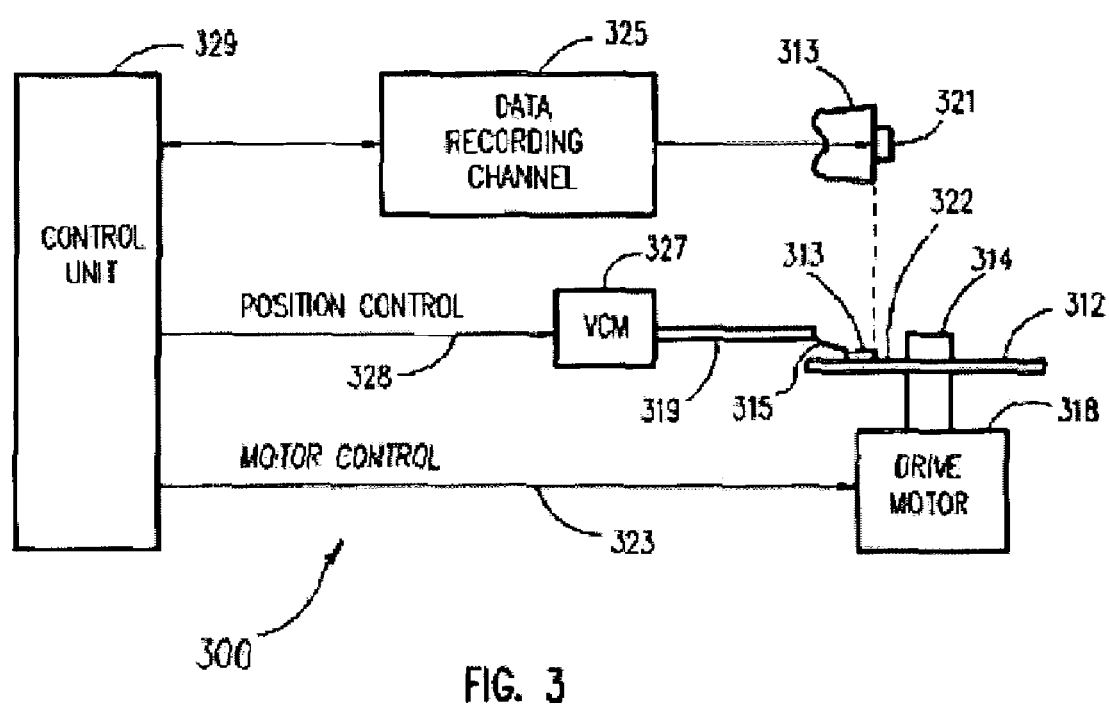
FIG. 3 is a perspective drawing of a magnetic recording disk drive system in accordance with one embodiment of the present invention.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different portions of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a magnetic disk storage system, and the accompanying illustration of FIG. 3 are for representation purposes only. It should be apparent that disk storage systems may contain a large number of disks and actuators, and each actuator may support a number of sliders.

Figure 4:
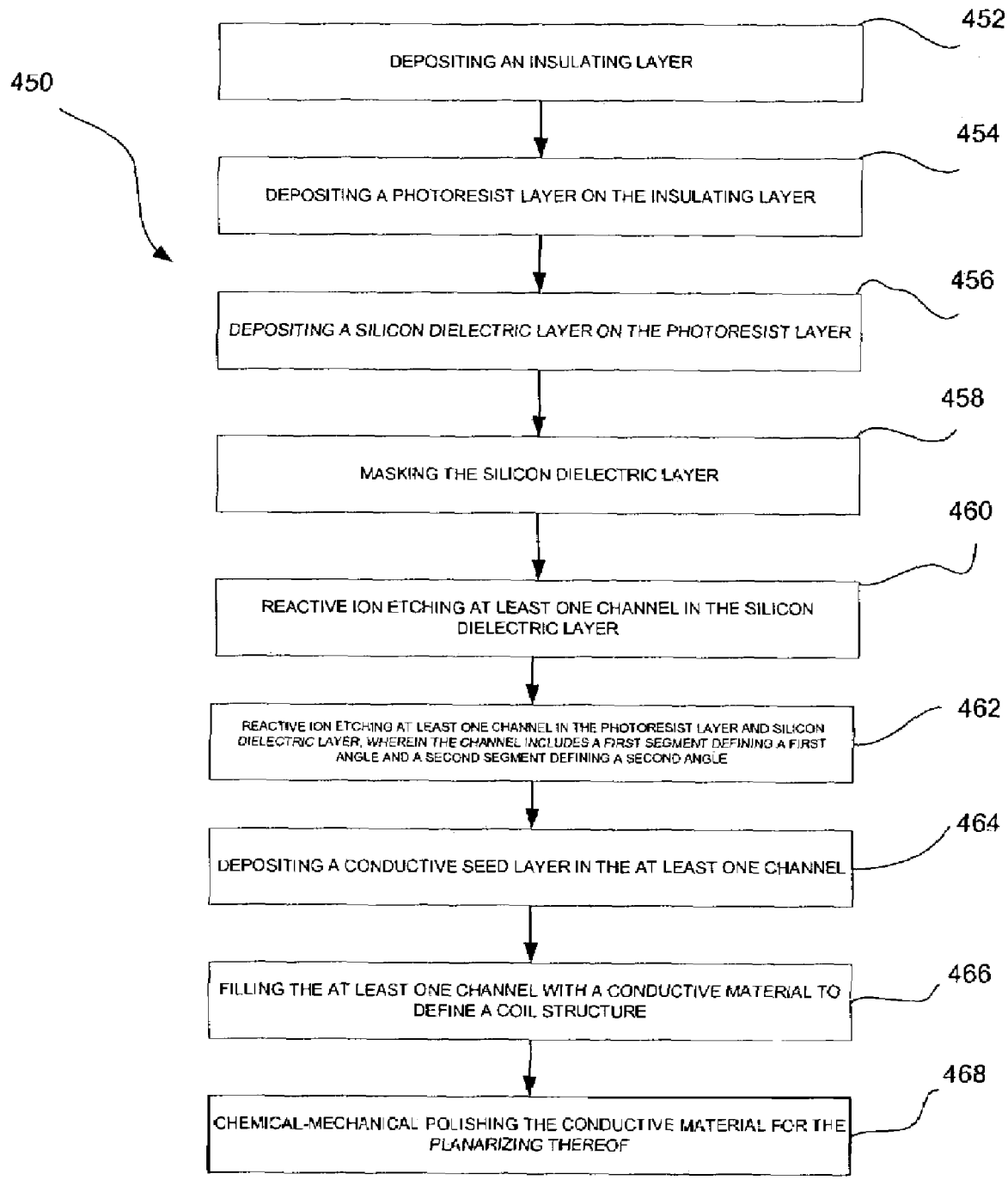
FIG. 4 illustrates a Damascene process by which a coil structure may be manufactured, in accordance with one embodiment.

FIG. 4 illustrate a process 450 for manufacturing a coil structure for a magnetic head with a high aspect ratio. In one embodiment, the process 450 of FIG. 4 may be used in the context of the head 321 of FIG. 3. Of course, the process 450 of FIG. 4 may be implemented in any desired context.

As shown, a Damascene-type process 450 is provided for manufacturing a coil structure for a magnetic head, in accordance with one embodiment. In such embodiment, an insulating layer (i.e. etching stop layer, etc.) is initially deposited after which a photoresist layer is deposited. Note operations 452 and 454. In one embodiment, the insulating layer may be constructed from an alumina material or any other material desired. As will soon become apparent, such particular insulating layer and photoresist layer are tailored for optimal planarization and coil insulation prior to coil pattern formation.

Moreover, the photoresist layer may include a hard-baked photoresist material to enable higher aspect ratios in the resultant coil structure, as will soon become apparent. Still yet, such photoresist layer may be deposited with a thickness range of 2 to 5 um, and may include AZ 1529 hard-baked, or cured, photoresist.

Next, a hard mask layer is deposited on the photoresist layer. See operation 456. In one embodiment, such hard mask layer may include a silicon dielectric (i.e. $SiO_2$, $Si_3N_4$ or any other desired silicon dielectric material that is capable of effecting higher aspect ratios due to its high etching selectivity to the initial photoresist). Moreover, such hard mask layer may be deposited with a thickness range of 1,500 to 5,000 Angstroms.

Then, as an option, an adhesion promoter layer may be deposited (not shown). In one embodiment, the adhesion promoter layer may include at least one of HMDS and BALI material. As will become apparent, the AZ1529/SiO2/HMDS layering of one optional embodiment may provide for narrow coil pitch definition.

A masked second imaging photoresist layer is applied on the adhesion promoter layer in operation 458. Optionally, the masked second imaging photoresist layer may be deposited with a thickness range of 5,000 to 8,000 Angstroms, and may include AZ 7905 photoresist. Moreover, the masked second imaging photoresist layer may define a plurality of channels with any desired thickness (i.e., 0.3 um).

Next, a plurality of channels is etched in the adhesion promoter layer and the silicon dielectric layer using $CF_4$/$CHF_3$ reactive ion etching. See operation 460. The channels are further etched into the initial photoresist layer using the silicon dielectric layer as a hard mask. See operation 462. Preferably, high density plasma reactive ion etching (RIE) is utilized. In one embodiment, the reactive ion etching may include $H_2/N_2/CH_3F/C_2H_4$ reducing chemistry to achieve improved aspect ratios and desired channel profile.

In the prior art, performing the standard process often resulted in deficient aspect ratios due to the ion milling limitation in conductive seed layer removal. To overcome the deficiencies of the prior art and improve the aspect ratios of a resultant coil structure, a two-step RIE process is employed to provide two-segment channels each defining different angles. More information regarding such structure and process will be set forth during reference to FIGS. 4A-4E.

Then, in operation 464, a conductive seed layer (i.e. Cu, $TaN_x$, Ta, etc.) is deposited in the channels. The channels are then filled with a conductive material (i.e. Cu, etc.) to define a coil structure. Note operation 466. The silicon dielectric layer, the conductive seed layer, and portions of the conductive material are then removed using chemical-mechanical polishing (CMP). See operation 468. The coil structure may then be processed further in a manner that makes the same suitable for use with a magnetic head. FIGS. 4A-4E illustrate the various operations set forth in the process of FIG. 4 in greater detail.

Figure 4A:
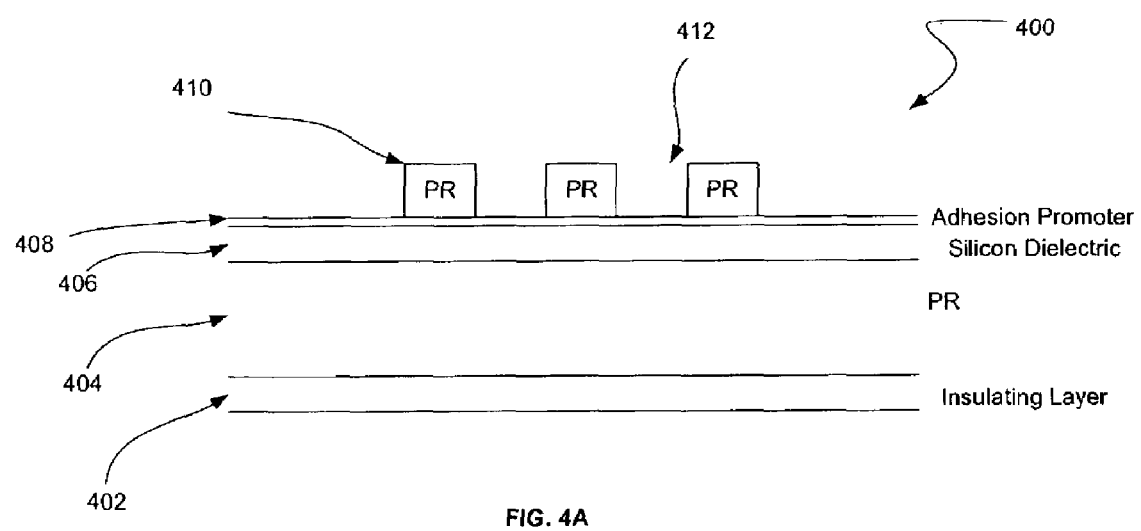
FIGS. 4A-4F illustrate the various operations set forth in the process of FIG. 4 in greater detail.

FIG. 4A illustrates a cross-sectional view of a stack 400 of materials with which the coil structure of the present embodiment is constructed. In the context of the process 450 of FIG. 4, the stack 400 is generated during operations 452-458. As shown, the stack 400 includes an insulating layer 402. Deposited on the insulating layer 402 are a first photoresist layer 404 and a silicon dielectric layer 406. As an option, an adhesion promoter layer 408 may be deposited on the silicon dielectric layer 406. Such adhesion promoter layer 408 receives a patterned second photoresist layer 410 forming a mask. The patterned second photoresist layer 410 defines a plurality of channels 412 which, in turn, will define the resultant coil structure, as will soon become apparent.

Figure 4B:
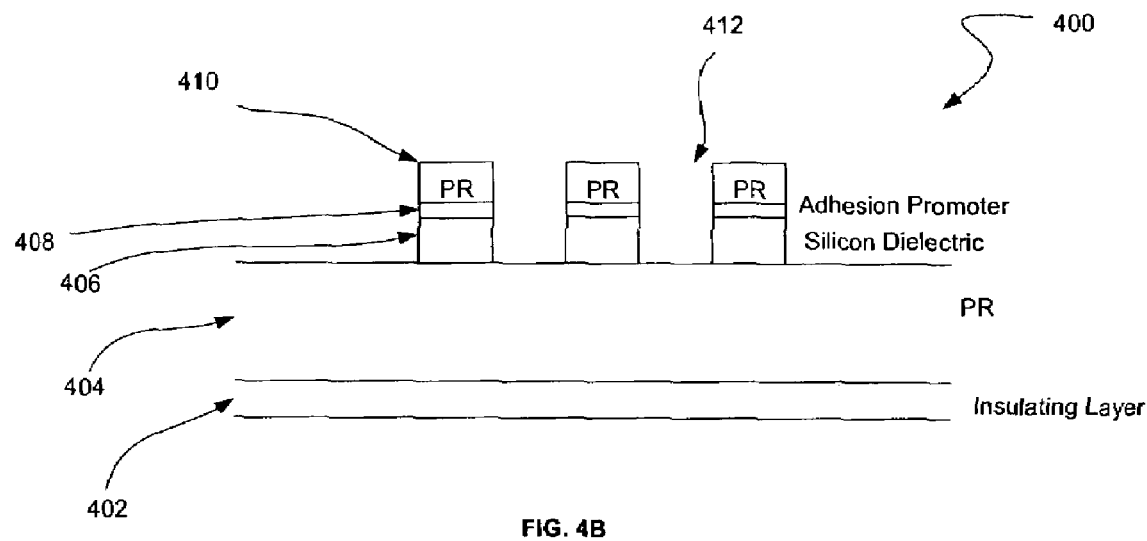

FIG. 4B illustrates another cross-sectional view of the stack 400 after a hard mask etching process, in accordance with operation 460 of FIG. 4. Preferably, reactive ion etching (RIE) with $CF_4/CHF_3$ chemistry is employed. The $CF_4/CHF_3$ gas ratio may be 1/7 with a pressure of 3 to 10 mTorr. Coil power can range from 400 to 800 watts while radio frequency (RF) power may vary from 50 to 100 watts. As shown, the RIE process results in an etching of the channels 412 down to the silicon dielectric layer 406 vertically.

Figure 4C:
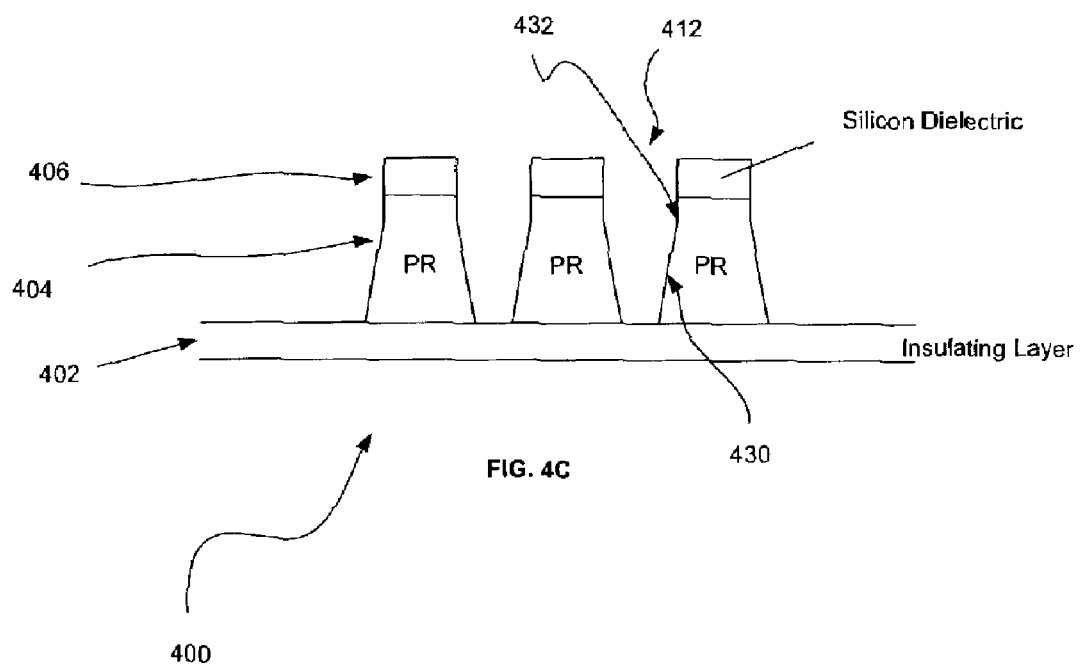

FIG. 4C is the cross-sectional view of stack 400 after an initial under layer photoresist etching process, in accordance with operation 462 of FIG. 4. In one embodiment, high density plasma reactive ion etching (RIE) is employed. As shown, the RIE process results in an etching of the channels 412 down to the insulating/etch stop layer 402.

As shown, the channels 412 include multiple segments each defining different wall angles, in order to overcome the deficiencies of the prior art and improve the aspect ratios of a resultant coil structure. In particular, each channel 412 includes a first segment 430 defining a first angle and a second segment 432 defining a second angle. The first segment 430 of each channel 412 may be positioned below the corresponding second segment 432.

In one embodiment, the first segment 430 may define a beveled angle. Optionally, the first segment 430 may define an angle between 70 and 85 degrees with respect to a horizontal to ease requirements on seed layer deposition and related processes. In one embodiment, the height of the first segment 430 may be such that it extends from the underlying layer to a point 20 to 80% of the total resultant channel height from the top.

In contrast, the second segment 432 may define an angle that is substantially vertical. As an option, the second segment 432 may define an angle between 80 and 90 degrees with respect to a horizontal for high extendibility to narrow coil pitch.

In another embodiment, the reactive ion etching may include $H_2/N_2/CH_3F/C_2H_4$ reducing chemistry with an $H_2$ flow of 50 to 100 sccm, $N_2$ flow of 50 to 200 sccm, $CH_3F$ flow of 1 to 3 sccm, and $C_2H_4$ flow 0 to 10 sccm. The pressure can range from 5 to 20 mTorr and temperature can range from −30 to 0° C. In an inductively coupled plasma system, the coil power can be 900 to 1500 watts, the RF power can be 100 to 200 watts, and the magnitude of RF bias may be about 120V. Under these conditions etch rate of the hard-baked photoresist is about 3000 to 5000 A/min.

Figure 1:
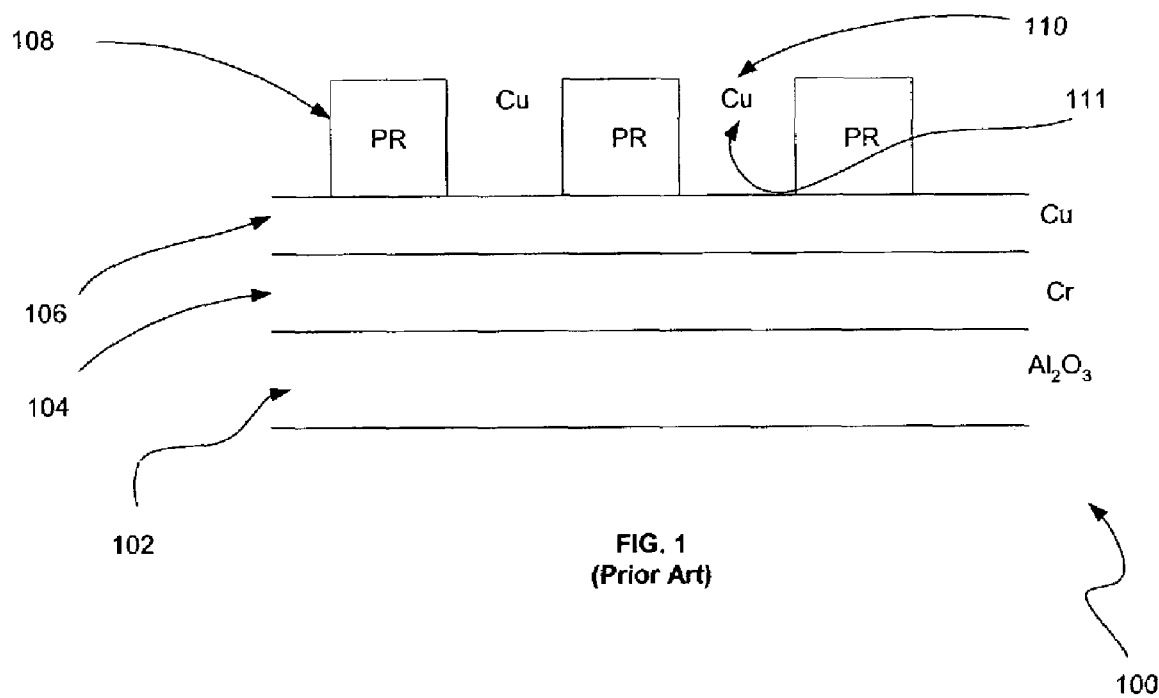
FIGS. 1-2 illustrate a method of manufacturing a coil structure associated with a magnetic head, in accordance with the prior art.
Figure 2:
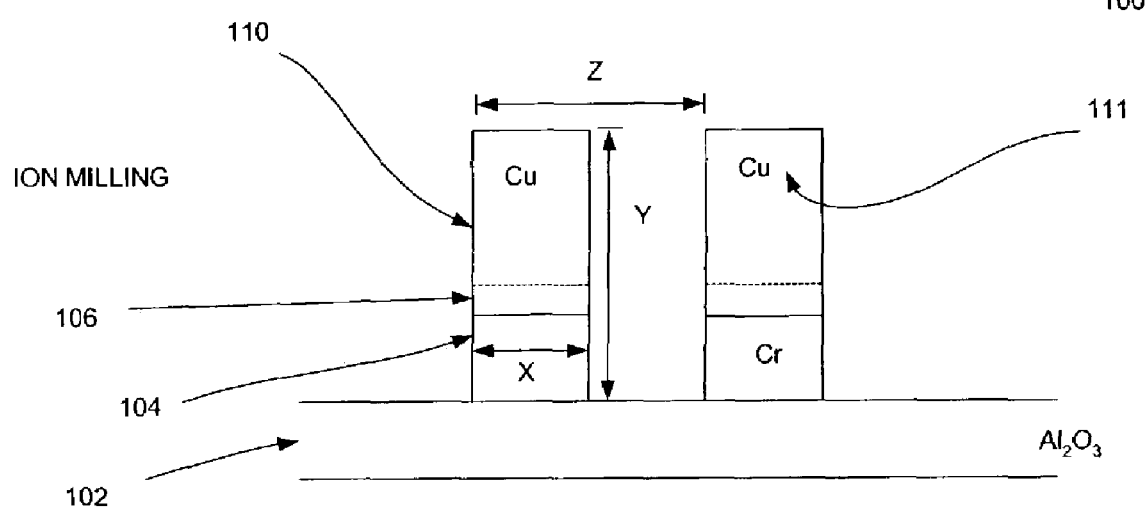
Figure 4D:
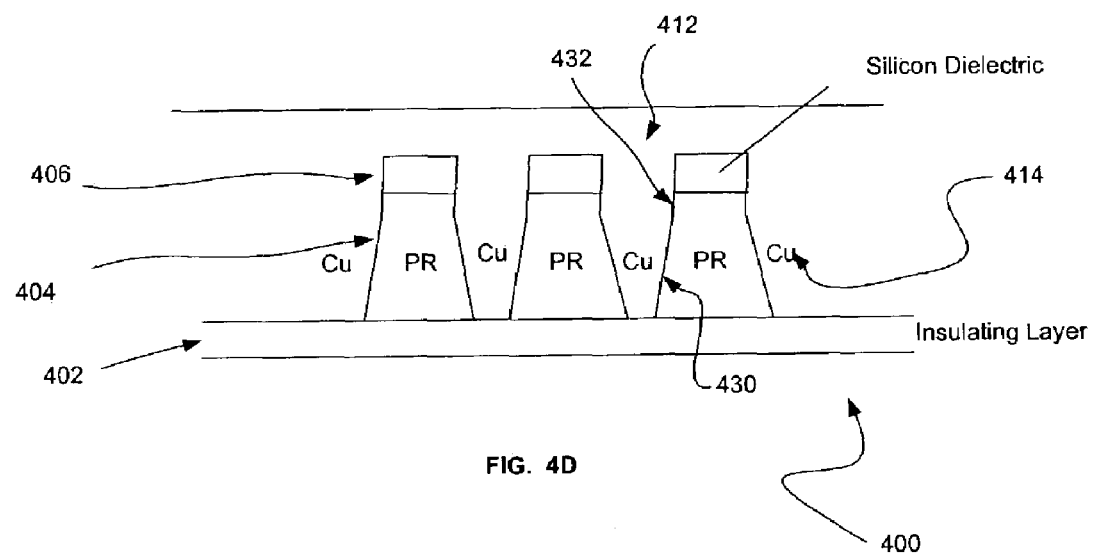

FIG. 4D shows the manner in which the channels 412 are filled with a seed layer (not shown), in accordance with operation 464 of FIG. 4; and the channels 412 are filled with a conductive material 414 by electroplating. Note operation 466 of FIG. 4. By depositing the conductive seed layer after etching, the Damascene process 450 avoids the need to remove a seed layer as is required in the prior art. See again FIGS. 1-2.

Figure 4E:
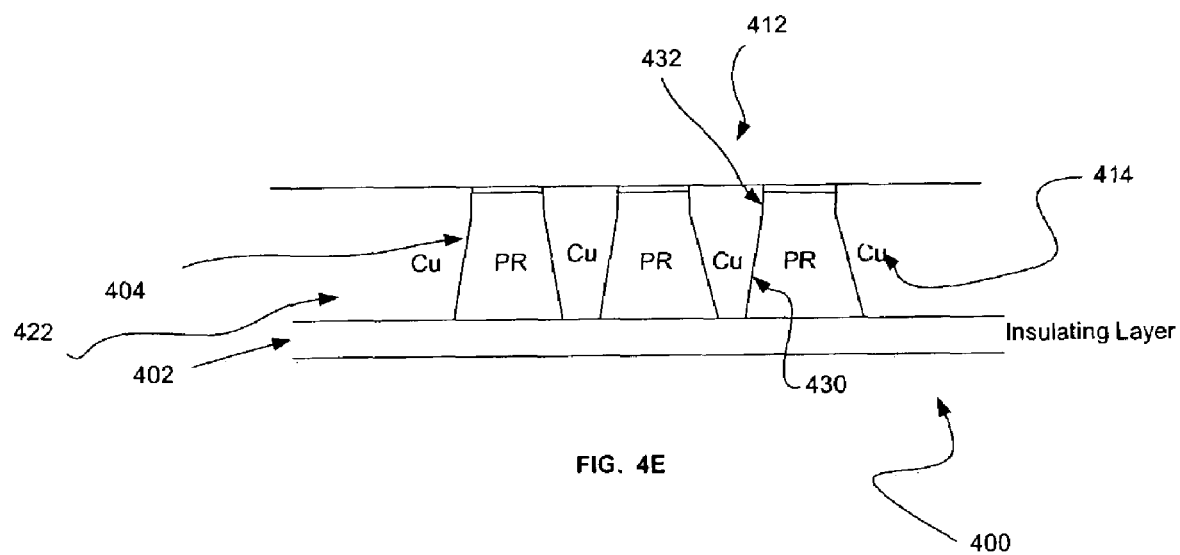

FIG. 4E illustrates the manner in which a plurality of the layers of the stack 400 is removed by chemical-mechanical polishing, in accordance with operation 468 of FIG. 4. In particular, at least a portion of the silicon dielectric layer 406, the conductive seed layer, and portions of conductive material 414 are removed. As shown, the polishing results in a coil structure 422 with a planar surface.

Again, each channel 412 of the coil structure 422 includes a first segment 430 defining a first beveled angle and a second segment 432 defining a second substantially vertical angle. A reactive ion etching process with $H_2/N_2/CH_3F/C_2H_4$ reducing chemistry may be employed in the channel pattern formation. The multi-segment profile may serve to relax the requirements of the seed layer processing, without necessarily compromising extendibility to narrower coil pitch and high aspect ratio. By this structure and the RIE process, aspect ratios of greater than 2.5 and even 4 may be achieved, with a coil pitch greater than 1 um, and 6 turn coil resistance of 2 ohms.

Figure 4F:
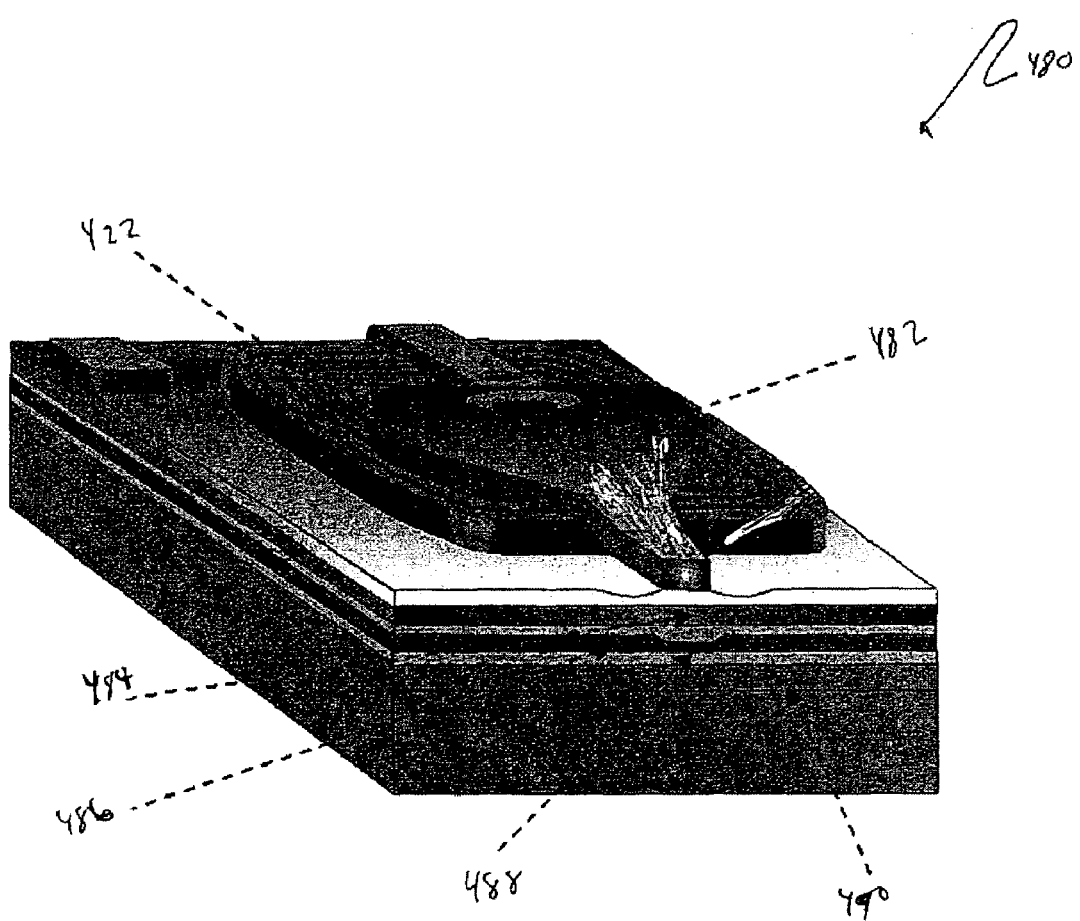

FIG. 4F illustrates the coil structure 422 in the context of a head 480, in accordance with one embodiment. It should be noted that the various remaining components of the head 480 may vary per the desires of the user. As shown, the head 480 includes an inductive write head P2 layer 482 positioned above the coil structure 422. Positioned below the coil structure 422 is an inductive write head P1 layer & top shield layer 484. GMR contacts and a hard bias layer 486 are situated below layer 484 with a GMR sensor 488 situated therein. Further provided is a bottom shield 490.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
an underlying layer, the underlying layer being electrically insulating;
a photoresist layer positioned adjacent the underlying layer and having two opposing sides defining a channel with a plurality of turns, a bottom of the channel extending between the opposing sides being defined by the underlying layer; and
a coil structure formed of a conductive material situated in the channel with a plurality of turns;
wherein a profile of each of the sides of the photoresist layer that define the channel includes a first segment and a second segment that is contiguous with the first segment, the first segment defining a first angle relative to a plane of deposition of the photoresist layer, the second segment defining a second angle relative to the plane of deposition of the photoresist layer, the second angle being different than the first angle,
wherein the first segment of each side of the photoresist layer is positioned below the second segment located contiguously thereto,
wherein a height of the first segment of each side of the photoresist layer measured perpendicular to the plane of deposition of the photoresist layer extends from the underlying layer to a point between 20% and 80% of a total channel height from a top of the channel.

2. The magnetic head as recited in claim 1, wherein the height of the first segment of each side of the photoresist layer is greater than a height of the second segment located contiguously thereto.

3. The magnetic head as recited in claim 1, wherein the first segment of each of the opposing sides of the photoresist layer taper together towards the underlying layer.

4. The magnetic head as recited n claim 3, wherein the first segment defines an angle between 70 and 85 degrees relative to the plane of deposition of the photoresist layer.

5. The magnetic head as recited in claim 1, wherein the second segment defines an angle that is substantially perpendicular to the plane of deposit on of the photoresist layer.

6. The magnetic head as recited in claim 5, wherein the first segment defines an angle between 70 and 85 degrees relative to the plane of deposition of the photoresist layer.

7. The magnetic head as recited in claim 1, wherein the second segment defines an angle between 80 and 90 degrees relative to the plane of deposition of the photoresist layer.

8. The magnetic head as recited in claim 1, wherein the channel is formed by reactive ion etching, wherein the reactive ion etching includes $H_2/N_2/CH_3F/C_2H_4$ reducing chemistry.

9. The magnetic head as recited in claim 1, wherein the photoresist is hard-baked.

10. The magnetic head as recited in claim 1, wherein the conductive material includes Cu.

11. The magnetic head as recited in claim 1, wherein an aspect ratio of the channel and coil structure is at least 2.5.

12. The magnetic head as recited in clam 1, wherein the layer of photoresist does not overlay the coil structure.

13. A magnetic head, comprising:
   an underlying layer, the underlying layer being electrically insulating;
   a photoresist layer positioned adjacent the underlying layer and having two opposing sides defining a channel with a plurality of turns, a bottom of the channel extending between the opposing sides being defined by the underlying layer; and
   a coil structure formed of a conductive material situated in the channel with a plurality of turns;
   wherein a profile of each of the sides of the photoresist layer that define the channel includes a first segment and a second segment that is contiguous with the first segment, the first segment defining a first angle relative to a plane of deposition of the photoresist layer, the second segment defining a second angle relative to the plane of deposition of the photoresist layer, the second angle being different than the first angle,
   wherein the first segment of each side of the photoresist layer is positioned below the second segment located contiguously thereto,
   wherein a height of the first segment of each side of the photoresist layer measured perpendicular to the plane of deposition of the photoresist layer extends from the underlying layer to a point between 20% and 80% of a total channel height from a top of the channel,
   wherein the first segment of each of the opposing sides of the photoresist layer taper together towards the underlying layer,
   wherein second segment defines an angle between 80 and 90 degrees relative to the plane of deposition of the photoresist layer,
   wherein the first segment defines an angle between 70 and 85 degrees relative to the plane of deposition of the photoresist layer.

14. The magnetic head as recited in claim 13, wherein the layer of photoresist does not overlay the coil structure.

15. A disk drive system, comprising:
   a magnetic recording disk;
   a magnetic head including:
      an insulating layer,
      a photoresist layer positioned adjacent the insulating layer, the photoresist layer having opposing sides defining at least one channel with a plurality of turns, and
      a coil structure defined by a conductive material situated in the channel with a plurality of turns,
      wherein each of the sides of the photoresist layer includes a first segment defining a first angle and a second segment defining a second angle, the first and second segments being contiguous;
      wherein a height of the first segment measured perpendicular to the plane of deposition of the photoresist layer extends from the insulating layer to a point between 20% and 80% of a total channel height from a top of the channel;
      wherein the photoresist layer does not overlay the coil structure,
   an actuator for moving the magnetic head across the magnetic recording disk so the magnetic head may access different regions of the magnetic recording disk; and
   a controller electrically coupled to the magnetic head.

16. A magnetic head, comprising:
   an insulating layer;
   a photoresist layer positioned adjacent the insulating layer for defining at least one channel with a plurality of turns; and
   a coil structure defined by a conductive material situated in the at least one channel with a plurality of turns, wherein the photoresist layer does not overlay the coil structure;
   wherein a profile of the channel includes a first segment defining a first angle relative to a plane of deposition of the photoresist layer, and a second segment continuous with the first segment, the second segment defining a second angle relative to a plane of deposition of the photoresist layer, the second angle being different than the first angle.

17. The magnetic head as recited in claim 16, wherein the height of the first segment of each side of he photoresist layer is greater than a height of the second segment located contiguously thereto.

18. The magnetic head as recited in claim 16, wherein the first segment of each of the opposing sides of the photoresist layer taper together towards the underlying layer.

19. The magnetic head as recited in claim 18, wherein the first segment defines an angle between 70 and 85 degrees relative to the plane of deposition of the photoresist layer.

20. The magnetic head as recited in claim 16, wherein the second segment defines an angle that is substantially perpendicular to the plane of deposition of the photoresist layer.

21. The magnetic head as recited in clam 16, wherein the second segment defines an angle between 80 and 90 degrees relative to the plane of deposition of the photoresist layer.

22. The magnetic head as recited in claim 21, wherein the first segment defines an angle between 70 and 85 degrees relative to the plane of deposition of the photoresist layer.

23. The magnetic head as recited in claim 16, wherein the channel is formed by reactive ion etching, wherein the reactive ion etching includes $H_2/N_2/CH_3F/C_2H_4$ reducing chemistry.

24. The magnetic head as recited in claim 16, wherein the photoresist is hard-baked.

25. The magnetic head as recited in claim 16, wherein the conductive material includes Cu.

26. The magnetic head as recited in claim 16, wherein an aspect ratio of the channel and coil structure is at least 2.5.

* * * * *

UNITED STATES PATENT AND TRADEMARK OFFICE
CERTIFICATE OF CORRECTION

PATENT NO. : 7,397,634 B2 Page 1 of 1
APPLICATION NO. : 10/602462
DATED : July 8, 2008
INVENTOR(S) : Bedell et al.

It is certified that error appears in the above-identified patent and that said Letters Patent is hereby corrected as shown below:

col. 7, line 43 change "wherein second" to --wherein the second--;
col. 8, line 32 change "he" to --the--;
col. 8, line 44 change "clam" to --claim--.

Signed and Sealed this

Third Day of March, 2009

JOHN DOLL
*Acting Director of the United States Patent and Trademark Office*